W. C. CARR.
WEIGHING SCALE.
APPLICATION FILED NOV. 20, 1908.
947,693.
Patented Jan. 25, 1910.
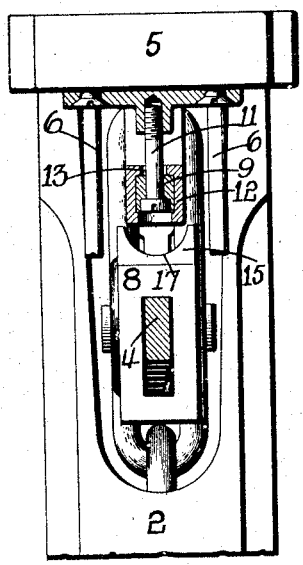
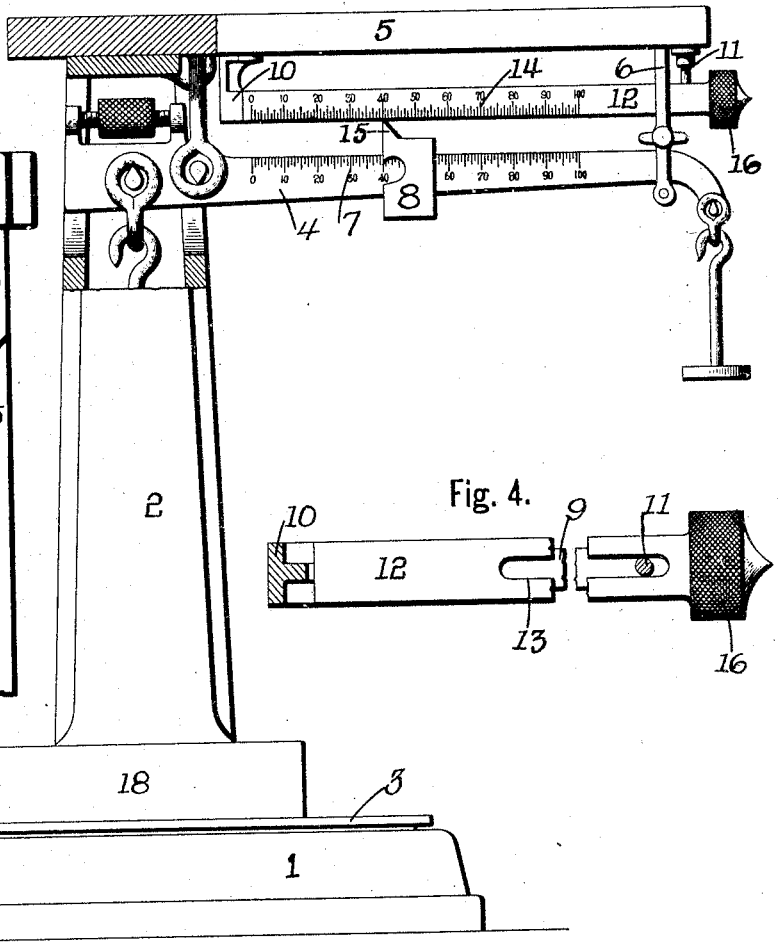
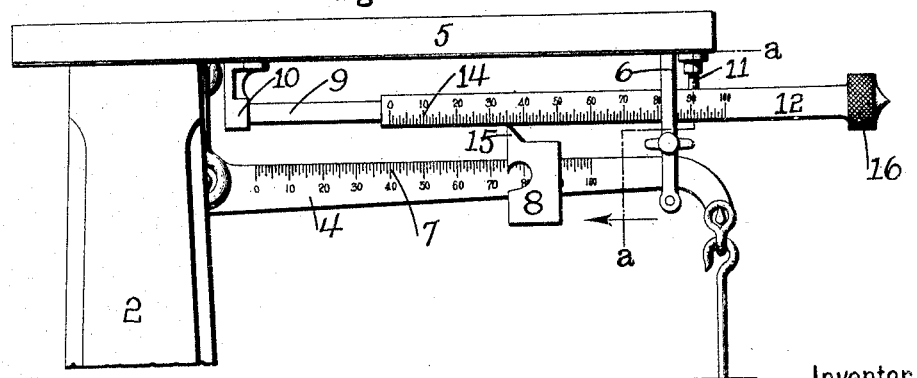
Witnesses.
L. M. Sangster.
George A. Neubauer.
Inventor.
William C. Carr.
By A. K. Sangster, Attorney.

UNITED STATES PATENT OFFICE.

WILLIAM C. CARR, OF BUFFALO, NEW YORK.

WEIGHING-SCALE.

947,693.  Specification of Letters Patent.  Patented Jan. 25, 1910.

Application filed November 20, 1908. Serial No. 463,507.

*To all whom it may concern:*

Be it known that I, WILLIAM C. CARR, a citizen of the United States, residing at Buffalo, in the county of Erie and State of New York, have invented a certain new and useful Improvement in Weighing-Scales, of which the following is a specification.

This invention relates to improvements in weighing scales, and the object of the invention is to indicate the total weight of all packages placed on the scales and also separately the individual weight of each package as it is weighed on the scales.

The invention also relates to certain details of construction of the individual weight indicating mechanism which will be hereinafter described and claimed, reference being had to the accompanying drawings in which,—

Figure 1 is an end elevation of the improved weighing scales, the standard and horizontal arm being shown partially in section to disclose the construction. Fig. 2 is a fragmentary view of the standard showing the weight indicating mechanism and the manner of indicating the total weight and the individual weight of the packages. Fig. 3 is an enlarged section on line *a a*, Fig. 2. Fig. 4 is an enlarged fragmentary plan view of the individual weight indicating beam, showing a transverse section through its supports.

In referring to the drawings in detail like numerals designate like parts.

In Fig. 1 the improved weight indicating mechanism is illustrated in operative position on a beam scales. The base 1, of the scales has an upright standard 2, near one end, and a weighing platform 3, which is movably mounted on the base and is connected in the usual and well known way to a balancing weighing beam 4. The weighing beam 4, is pivotally supported from near the upper end of the standard and extends approximately horizontally out from said standard in the usual way as shown in Fig. 1. A horizontal arm 5, projects laterally from the top of the standard and has a depending loop 6, near its outer end through which the weight beam 4, passes to limit the balancing movement of the beam 4 in either direction. The weighing beam 4, is provided with graduations constituting a weight indicating scale 7, and an indicating weight 8, which is slidably mounted on the beam, and serves to indicate by its position relatively to the scale 7, the weight of an article or articles placed on the weighing platform. Between the horizontal arm 5, and the weighing beam 4, is located a separate weight indicating mechanism which is utilized to independently indicate the individual weight of each article as it is weighed.

The separate weight mechanism consists of a horizontal stationary member or bar 9, which is hung from the arm 5, by two depending brackets 10 and 11, and a tubular member 12, which is slidably mounted on the stationary member. The tubular member 12, has a longitudinal slot 13, through which the bracket 11, extends as shown in Fig. 4, and a series of graduations which form an individual weight indicating scale 14. The tubular slidable member 12, is secured against detachment from and is prevented from rotating on the stationary member 9, by means of the bracket 11, and is also limited in its longitudinal range of movement to the length of the slot 13. The indicating weight 8, has an upwardly projecting beveled extension 15, which constitutes a pointer to indicate the individual weight on the scale 14. The extension 15, is recessed as shown at 17, in Fig. 3, to allow free balancing movement of the beam 4, when an article is being weighed. For convenient manual manipulation, an enlarged head 16, is formed at the outer extremity of the tubular member.

The operation of this weighing scale is as follows,—An article 18, being placed on the weighing platform 3, weighing, for instance, as shown in Fig. 1, forty pounds, the weighing beam 4, will balance when the weight 8, indicates forty pounds on the scale 7, and also indicates forty pounds on the individual weight indicating scale 14, by means of the extension 15. Now to ascertain the individual weight of another article placed on the weighing platform without removing the first article, the tubular member 12, is moved outwardly on the stationary member 9, by pulling on the enlarged head 16, until the character "0" constituting the beginning of the individual weight indicating scale 14, is vertically over the extension or pointer 15. The movement of the weight 8, on the weighing beam 4, to a position to balance the beam will indicate the total weight of both articles on the weight indicating scale 7, of the weighing beam which in the instance illustrated in the accompanying drawings would be seventy five pounds, and also separately indicate through the pointer 15, the individual weight of the second article placed on the scales, which in the illustration would be thirty five pounds.

The individual weight indicating mechanism herein described can be easily attached to any of the well known types of beam scales requiring but slight alteration in structure.

The main advantage of the invention is that both the total weight of all articles placed on the scales and the individual weight of each article as it is placed thereon will be separately indicated.

I claim.

1. In a beam scales, the combination with a pivotally mounted weighing beam and an individual weight scale beam slidably mounted in proximity to said weighing beam, of a balancing weight slidably mounted on the weighing beam and having an extension for indicating weight on the individual weight scale beam, said extension extending closely to the individual weight scale beam and being recessed at its outer edge to permit free balancing movement of the pivotally mounted weighing beam, substantially as set forth.

2. In a weighing scales, the combination with a pivotally mounted weighing beam, of an individual weight indicating beam located vertically over the weighing beam and having an individual weight indicating scale on its lower edge and a balancing weight on the pivotally mounted scale beam having means for indicating weight on the pivotally mounted scale beam and an upwardly extending indicating extension extending in operative proximity to the indicating scale on the individual weight indicating beam; said extension being concaved on the top to permit free balancing movement of the pivotally mounted beam without striking the individual weight indicating beam.

3. In a beam scales, the combination with a weighing beam, of an individual weight indicating mechanism in proximity to said weighing beam consisting of a stationary member and a tubular slidable member adapted to telescope on the stationary member.

4. In a beam scales, the combination with a weighing beam, of an individual weight indicating mechanism is proximity to said weighing beam consisting of a stationary member and a tubular slidable member adapted to telescope on the stationary member and having a longitudinal slot, and an extension projecting laterally from the stationary member and extending through the slot.

5. In a weighing scales, the combination with the main weight indicating mechanism, of a separate independent individual weight indicating mechanism consisting of a stationary element and a tubular element slidably telescoped on the stationary element.

6. In a weighing scales, the combination with a horizontal arm, of a bar attached to said horizontal arm by brackets and a tubular member slidably telescoped on said bar and having a longitudinal slot through which one of the brackets extend.

7. In a weighing scales, the combination with a horizontal arm, of a bar attached to said horizontal arm by brackets and a tubular member slidably telescoped on said bar and having a longitudinal slot through which one of the brackets extend and a weight indicating scale.

WILLIAM C. CARR.

Witnesses:
L. M. SANGSTER,
GEORGE A. NEUBAUER.